UNITED STATES PATENT OFFICE.

VALENTIN LAPP, OF BERLIN, GERMANY.

PROCESS FOR THE MANUFACTURE OF WORTS.

No. 891,553.   Specification of Letters Patent.   Patented June 23, 1908.

Application filed January 2, 1907. Serial No. 350,496.

*To all whom it may concern:*

Be it known that I, VALENTIN LAPP, manager, residing at No. 47 Kurfürstendamm, in Berlin, Kingdom of Prussia, German Empire, have invented certain new and useful Improvements in Processes for the Manufacture of Worts, of which the following is the specification.

For the manufacture of beer worts it has been usual hitherto to employ chiefly malted barley, sometimes with an admixture of the raw grain.

The mashing of the malt, as hitherto practiced, does not exhaust the malt completely; there always remains in the brewer's grains a quantity of starch and other extractive substances. The same remark applies to the raw grain, which also retains a quantity of unconverted starch and other valuable substances. In malting the barley a considerable loss of valuable substances occurs.

In the process of malting, the objects have been to loosen the highly resisting skin or walls of the starch cells, so as to facilitate the subsequent solution of the starch, and to render soluble the insoluble albuminous substances. These objects have been attained very imperfectly because, in order that the germinating power of the barley may not be destroyed, the barley can only be subjected to comparatively low temperatures in the drying operation, so that the water contained in the barley is only removed in part. In fact the barley will not dry completely if it has absorbed a very high percentage of water by reason of heavy rainfall during the harvest; indeed, it may be said that in normal harvest years the barley is not dried. Now a slight drying of the barley does not alter its tough resisting nature, and for this reason the processes of malting require the very long period of 3 to 4 days for soaking, 8 to 10 days for sprouting, and 2 days for kiln-drying; these operations also entail a great loss of substance.

According to the present invention the treatment of the barley for producing a wort is effected in a very short time, it may be even in a few hours. First, it is advisable as a preliminary step, to subject the barley to a thorough washing without reference to whether its integument remains whole. After the barley has been washed and is perfectly clean, it is transferred immediately into a pressure vessel and is therein subjected to a very high pressure with water at 40°–45° C. up to at most 50° C. At a pressure of about 25 to 30 atmospheres and over, the barley absorbs a proportion of water amounting to 40 to 45 per cent. and over in 10 to 25 minutes at most. The water in excess is then immediately and suddenly discharged by removing the pressure. In this manner the integuments and the whole tissue are loosened, which is not the case if the pressure is removed gradually.

In countries where the brewing regulations of the excise do not prescribe artificial germination of the barley, extraction of the water is begun at once, the water being reduced to 7 to 8 per cent. in a vacuum in a few hours at a temperature which must not exceed 50° C. The grain is then heated gradually to 100° C. and more, thus expelling more water until only about 1 per cent. is left. The grain is next immediately cooled to the temperature of the air and is then again placed under a high air pressure, for instance about 10 atmospheres, for about 30 to 50 minutes, whereby the grain is saturated with air, which, as experience has shown, more quickly renders it suitable for making a wort. The grain prepared in this manner is ground to flour and is introduced into a pressure vessel in the boiling house, mixed with water of ordinary temperature or of a temperature suitable for mashing to which 10 to 15 per cent. of a malt-product such as air dried malt or an extract thereof, have been added, and is subjected to a high pressure, for instance 10 to 15 atmospheres, and higher. The mash is now constantly stirred and the temperature slowly increased, first to 30° to 35° C., at which temperature it is kept for 5 minutes without further heating. It is then heated to 45° C., the rate of increase being preferably 1° per minute; the stirring and pressure are maintained throughout. The temperature is kept at 45° C. for 5 minutes, and then raised slowly to 65° C., where it is kept constant for five minutes, to be then raised to 70° to 75° C.; preferably each rise is at the aforesaid rate, the stirring and pressure being continued. The pressure is then removed and the wort is drawn off for the most part from the spent grains. The latter are mixed again with hot water, heated to boiling temperature, and then at first boiled in the open in order that the steam may escape freely together with the undesirable odoriferous vapors. After having boiled for some time in the open, the vessel is closed and then the boiling is resumed under steam pressure, which must not exceed ¼ atmosphere for 10 minutes in the case of light beers; for dark beers the steam pressure is increased to ½ atmosphere, and the boiling continued for about 15 minutes. By this boiling, a correspondingly higher degree of body is imparted to the wort. This second main wort thus produced is drawn off from the spent grains and is run into the vats in which the first concentrated main wort is contained, in such a manner that the temperature of the first main wort shall not exceed 75° C. The spent grains are then further washed and the wort is treated as usual. If desired, the wort may be subsequently sweetened by adding malt extract. For special beers the wort may be again boiled under pressure so long as the hops have not been added to it. In any case the solids which have separated up to this point are removed by suitable filtering, in order that they may not be re-dissolved during this second boiling.

In countries where the artificial germination of the barley is prescribed by the excise regulations the barley after having been soaked under pressure, is caused to germinate; but in this case the water used for the soaking process is not heated to a temperature higher than about 28° C. The barley is, however, allowed to germinate for a short time only, so that no considerable loss of substance can occur, because the development of the radicle and the plumule is not carried on to the usual extent. On the contrary, this development is retarded artificially, so that although germination and sprouting occur, there is no serious growth and consequent consumption of the substance of the grain.

When the barley has been prepared in the manner described, the germination is terminated within two days at the latest. The malt is freed from its contained water with aid of a vacuum and is heated and treated with air just as has been described with reference to the treatment of ungerminated grain. The effect of this germination is to loosen the texture of the barley somewhat, so that in the treatment in the boiling house according to the process already described, from 3 per cent. to at most 5 per cent. of air, dried malt is sufficient the treatment of the grain remaining the same in other respects.

The worts which are produced according to the foregoing processes have a high degree of viscosity and ferment with extreme energy in a short time. The worts have now acquired a greater viscosity and thereby absorb carbonic acid with greater facility. The ferment at the temperature of well water under a small excess of pressure in a short time, and already approach a degree of final fermentation during the short main fermentation.

After the main fermentation is completed, the fermented wort, without being filtered, is immediately cooled to a considerable degree, preferably to 1.5 – 2° below 0° C. instead of only to 1.2° above 0° C. as hitherto. By this sudden and rapid cooling, the last portion of imperfectly dissolved albumen which has not been consumed by the yeast, and might perhaps injuriously affect the finer quality and the stability of the beer, is completely precipitated so that it can be filtered off directly, and a very fine filtrate is obtained if the cooled wort is kept at a low temperature for a further period of 2 to 3 days after cooling. It is advantageous to refrigerate for at least 48 hours, but preferably 72 hours.

The new mashing process may obviously be utilized in a suitable manner in alcoholic distillation and in the manufacture of yeast.

Instead of grinding the soaked and kiln dried grain to flour, it is subjected to an intermediate hydraulic treatment. It has long been sought in brewing, to improve the comminution of the kiln-dried malt, namely to break up the hard points of the malt as well, so that they also may be properly mashed. This comminution has hitherto been effected exclusively by a dry process, namely in malt grinding mills. The recent improvements have been in the grinding mill itself.

The troubles experienced in dry-grinding are wholly obviated by this invention and the large husks which are necessary in clearing without filters, are recovered in the new process in a much more perfect and better manner than hitherto.

The malt to be comminuted is fed into a closed iron vessel constructed to withstand high pressures. This vessel is filled completely with cold or warm mashing water and is then placed under hydraulic pressure, which is raised to such a degree as to cause the malt to become thoroughly soaked through in a few minutes and to become so soft that it can be crushed between two fingers with very slight pressure, and then resembles a mash. After this preliminary operation, the malt is passed into a wet grinding mill of any suitable kind which reduces the malt to a floury mash with ease. The power required for this operation is no greater than would be required for the pumping of a mash. If the malt had not been previously subjected to a hydraulic treatment, it would have been impossible to grind it by rotating wet grinding mills. Experiments have shown that if the kiln-dried malt is fed directly into the wet grinding mill, with aid of water, the mill is choked up immediately, because it is unable, even with the greatest expenditure of power, to deal with malt, and even if it could do so, the power consumed would be so disproportionately great as to make the process impracticable. It is further to be noted that for this mode of grinding the malt will be injured if soaked in the ordinary way until it has absorbed 70-80 per cent. of water, as this would occupy so much time that the malt would become sour with lactic acid, and would spoil, quite apart from the fact that such a process could not possibly be carried out in brewing. The soaking must in fact be effected in a few minutes, so that the malt may not be injured and that the time occupied by the whole boiling process may be prolonged.

By the present process, the steps of grinding and mashing are both effected at the same time, for the product that has passed through the wet grinding mill is actually a mash and may be led from the wet mill in whole or in part either to the mash tun or to the vat.

The wort is made as hereinbefore set forth, that is to say the barley, after washing if necessary, is subjected to high pressure with the addition of water; the barley may, however, also be previously deprived of air, whereby the penetration of the soaking water is facilitated.

The disintegration of the grain may be considerably accelerated by adding an enzyme extract to the soaking water. The percentage of water contained in the grain is extremely high in this case, consequently the enzyme acts at once and intensely. The enzyme action may also be strengthened by addition of neutral gases such as carbonic acid, etc. Such gases as well as ozone, produce additional advantage that they delay putrefaction of the enzyme extracts.

Having thus fully described my invention, what I claim is:—

1. The process for the manufacture of wort, which consists in subjecting barley, in the presence of water, to a temperature below 50° C. and to a pressure exceeding substantially 25 atmospheres, then kiln-drying the grain to extract the water, then saturating the grain with air at ordinary temperature, then comminuting the grain, and finally heating it with a fermentable malt product.

2. The process for the manufacture of wort, which consists in subjecting barley in the presence of water, to a temperature below 50° C. and to a pressure exceeding substantially 25 atmospheres, then suddenly removing said pressure, then kiln-drying the grain to extract the water, then saturating the grain with air at ordinary temperature, then comminuting the grain and finally heating it with a fermentable malt product.

3. The process for the manufacture of wort, which consists in subjecting barley, in the presence of water, to a temperature below 50° C. and to a pressure exceeding substantially 25 atmospheres, then kiln-drying the grain to extract the water, then saturating the grain with air at ordinary temperature, then comminuting the grain, and finally heating it to gradually increasing temperatures with a fermentable malt product.

4. The process for the manufacture of wort, which consists in subjecting barley, in the presence of water, to a temperature below 50° C. and to a pressure exceeding substantially 25 atmospheres, then kiln-drying the grain to extract the water, then saturating the grain with air at ordinary temperature, then comminuting the grain, and finally heating it under pressure with a fermentable malt product.

5. The process for the manufacture of wort, which consists in subjecting barley, in the presence of water, to a temperature below 50° C. and to a pressure exceeding substantially 25 atmospheres, then kiln-drying the grain to extract the water, then saturating the grain with air at ordinary temperatures, then comminuting the grain, and finally heating it under pressure to gradually increasing temperatures with a fermentable malt product.

6. The process for the manufacture of wort, which consists in subjecting barley, in the presence of water, to a temperature below 50° C. and to a pressure exceeding substantially 25 atmospheres, then kiln-drying the grain to extract the water, then saturating the grain with air at ordinary temperature, then comminuting the grain with water, then heating it with a fermentable product, filtering the wort, and then boiling it.

In testimony whereof I have signed my name to this specification in the presence of two subscribing witnesses.

VALENTIN LAPP.

Witnesses:
 HENRY HASPER,
 WOLDEMAR HAUPT.